(12) United States Patent
Hung et al.

(10) Patent No.: US 8,582,804 B2
(45) Date of Patent: Nov. 12, 2013

(54) METHOD OF FACIAL IMAGE REPRODUCTION AND RELATED DEVICE

(71) Applicant: CyberLink Corp., New Taipei (TW)

(72) Inventors: Hao-Ping Hung, New Taipei (TW); Wei-Hsin Tseng, New Taipei (TW)

(73) Assignee: CyberLink Corp., Xindian Dist., New Taipei (TW)

( * ) Notice: Subject to any disclaimer, the term of this patent is extended or adjusted under 35 U.S.C. 154(b) by 0 days.

(21) Appl. No.: 13/860,541

(22) Filed: Apr. 11, 2013

(65) Prior Publication Data

US 2013/0230252 A1 Sep. 5, 2013

Related U.S. Application Data

(62) Division of application No. 12/211,807, filed on Sep. 16, 2008, now Pat. No. 8,447,065.

(51) Int. Cl.
*G06K 9/00* (2006.01)
*G06K 9/36* (2006.01)

(52) U.S. Cl.
USPC ............ 382/100; 382/118; 382/276; 704/200

(58) Field of Classification Search
None
See application file for complete search history.

(56) References Cited

U.S. PATENT DOCUMENTS

| | | |
|---|---|---|
| 3,038,061 A | 6/1962 | O'Reilly |
| 4,305,131 A | 12/1981 | Best |
| 5,262,877 A * | 11/1993 | Otsuka .......................... 386/285 |
| 5,430,495 A | 7/1995 | Ko |
| 5,548,340 A | 8/1996 | Bertram |
| 5,692,063 A | 11/1997 | Lee |
| 5,715,412 A * | 2/1998 | Aritsuka et al. .............. 715/729 |
| 5,852,438 A * | 12/1998 | Tomizawa et al. ............ 715/738 |
| 5,880,788 A | 3/1999 | Bregler |
| 5,953,485 A | 9/1999 | Abecassis |
| 5,963,265 A | 10/1999 | Bae |
| 5,991,443 A | 11/1999 | Gallery |
| 5,999,185 A | 12/1999 | Kato |
| 6,005,180 A | 12/1999 | Masuda |
| 6,023,675 A | 2/2000 | Bennett |
| 6,067,126 A | 5/2000 | Alexander |
| 6,067,399 A | 5/2000 | Berger |
| 6,133,904 A | 10/2000 | Tzirkel-Hancock |
| 6,154,601 A | 11/2000 | Yaegashi |
| 6,184,937 B1 | 2/2001 | Williams |
| 6,310,839 B1 | 10/2001 | Lee |
| 6,370,315 B1 | 4/2002 | Mizuno |
| 6,388,669 B2 | 5/2002 | Minami |
| 6,414,914 B1 | 7/2002 | Lee |
| 6,542,692 B1 | 4/2003 | Houskeeper |
| 6,571,255 B1 | 5/2003 | Gonsalves |
| 6,675,145 B1 | 1/2004 | Yehia |
| 6,748,116 B1 | 6/2004 | Yue |
| 6,904,176 B1 | 6/2005 | Chui |
| 7,015,934 B2 | 3/2006 | Toyama |
| 7,085,259 B2 | 8/2006 | Wang |
| 7,224,851 B2 | 5/2007 | Kinjo |
| 7,565,059 B2 | 7/2009 | Neuman |

(Continued)

*Primary Examiner* — Manav Seth
(74) *Attorney, Agent, or Firm* — Winston Hsu; Scott Margo

(57) ABSTRACT

To modify a facial feature region in a video bitstream, the video bitstream is received and a feature region is extracted from the video bitstream. An audio characteristic, such as frequency, rhythm, or tempo is retrieved from an audio bitstream, and the feature region is modified according to the audio characteristic to generate a modified image. The modified image is outputted.

1 Claim, 8 Drawing Sheets

(56) References Cited

U.S. PATENT DOCUMENTS

| | | |
|---|---|---|
| 8,004,593 B2 | 8/2011 | Kusaka |
| 8,218,886 B2 | 7/2012 | Ayres |
| 8,279,228 B2 | 10/2012 | Havaldar |
| 2003/0035567 A1 | 2/2003 | Chang |
| 2007/0236513 A1 | 10/2007 | Hedenstroem |

* cited by examiner

| Detected Pattern of the Sound Rhythm | Corresponding Behavior of the Visual Effect |
|---|---|
| Sharp increasing of the base frequency | Apply effect with respect to the rhythm, e.g. the face blushes with the rhythm |
| Beats of the sound | Change the visual effect with the beats, e.g. a blink effect |
| The frequency response is harmonic | Show musical notes around the users |
| The amplitude of the voice exceeds a predetermined threshold Thr1 and the average period between two neighboring beats is below a predetermined threshold Thr2 | Enhance saturation of the face color and blend with red |
| The amplitude of voice is below a threshold Thr3. (The user may be silent) | Show a snoring symbol and make the eyes smaller |

FIG. 3

METHOD OF FACIAL IMAGE REPRODUCTION AND RELATED DEVICE

CROSS REFERENCE TO RELATED APPLICATIONS

This application is a division of U.S. patent application Ser. No. 12/211,807, filed Sep. 16, 2008, and included herein by reference in its entirety for all intents and purposes.

BACKGROUND OF THE INVENTION

1. Field of the Invention

The present invention relates to video processing, and more particularly, to a method of modifying a feature region of an image according to an audio signal.

2. Description of the Prior Art

Web cameras are devices that typically include an image capturing device with a good refresh rate, and optionally a microphone for recording sound in the form of voice or ambient noise. The web camera is usually connected to a computing device, such as a personal computer or notebook computer, through a data interface, such as USB, or integrated with the computing device, e.g. in a housing of the notebook computer. The web camera may be utilized as a video device by software for transmitting streaming video and audio through a data network to provide video conferencing and chat functions between two or more users in a chat session.

As advanced video conferencing and chat technologies are developed, and as video chat grows in user base, users of video chat clients will demand greater ability to customize the video stream sent to their peers. For example, as face detection technologies are refined, facial features, such as hair, eyes, or skin may be modified, and the modifications may be made to track the location of the facial features. However, such modification is usually performed manually by the user, which can be cumbersome and inconvenient.

SUMMARY OF THE INVENTION

According to a first embodiment of the present invention, a method of facial image reproduction comprises retrieving an audio characteristic of an audio bitstream, receiving a video bitstream, extracting an image from the video bitstream, extracting a feature region from the image, modifying the feature region according to the audio characteristic to generate a modified image, and outputting the modified image.

According to the above embodiment of the present invention, an electronic device for performing facial image reproduction comprises an audio segmenting module for dividing the audio bitstream into a plurality of audio segments, a video segmenting module for dividing the video bitstream into a plurality of video segments, an audio processing module for retrieving an audio characteristic of the audio segments, an image extraction module for extracting an image from the video segments, a feature region detection module for extracting a feature region from the image, and an image modifying module for modifying the feature region according to the audio characteristic to generate a modified image.

According to a second embodiment of the present invention, a method of modifying an image based on an audio signal comprises capturing the image, recording a sound, performing image analysis on the image, retrieving an audio characteristic from the recorded sound, and modifying the image according to the audio characteristic to form a modified image.

According to the second embodiment of the present invention, a communication system comprises a transmitting computing device and a receiving computing device. The transmitting computing device comprises a system I/O interface for receiving an audio signal and a video signal, a processor for determining an audio characteristic of the sound, modifying an image of the video signal to generate the modified image according to the audio characteristic and encoding the modified image, and a network interface for sending the encoded signal. The second computing device comprises a network interface for receiving the encoded signal from the transmitting computing device, a processor for decoding the encoded signal to retrieve the modified image, and a display interface for outputting the modified image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a mapping table representing relationships between audio characteristics and modifications of feature regions.

DETAILED DESCRIPTION

Figure 1:
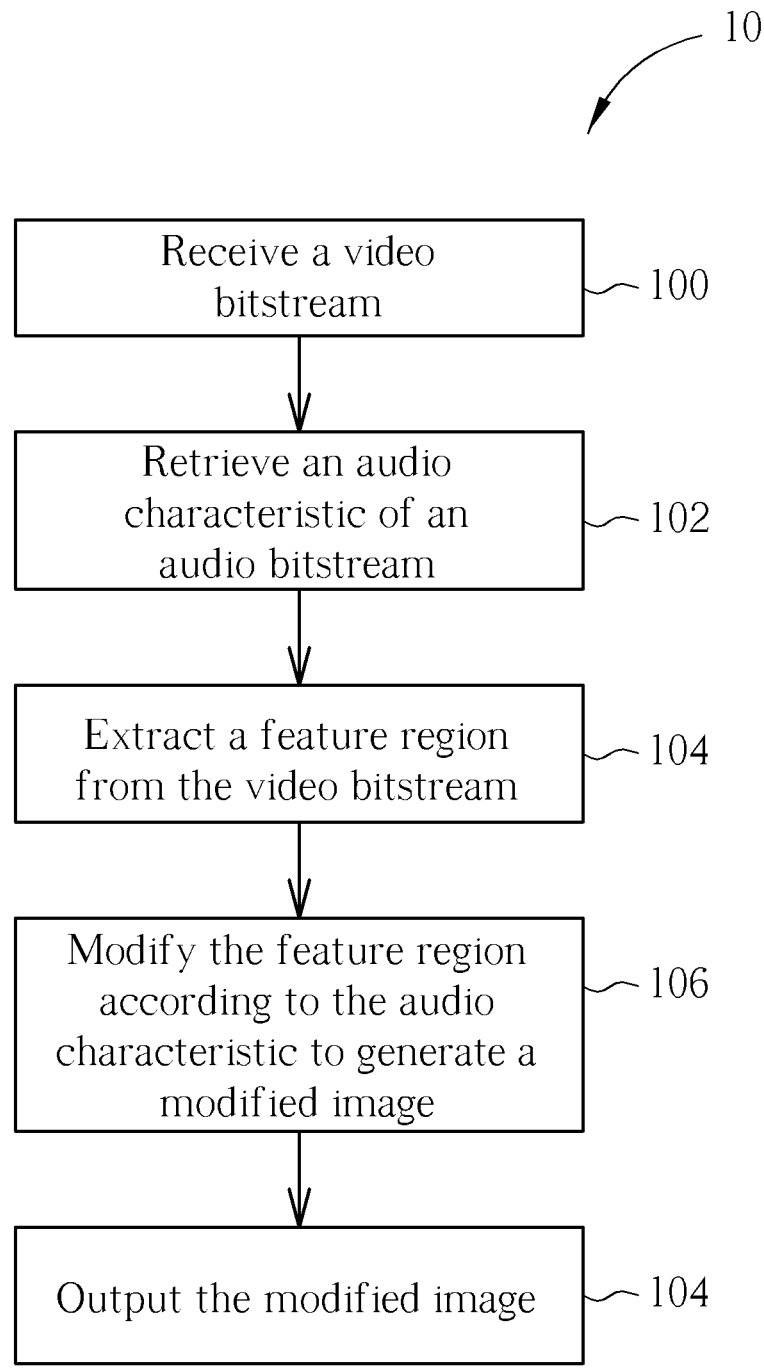
FIG. 1 is a diagram of a method for performing facial image reproduction according to an embodiment of the present invention.

Please refer to FIG. 1, which is a diagram of a method of performing facial image reproduction according to an embodiment of the present invention.

First, a video bitstream containing a facial image is received (Step 100). The bitstream is a time series of bits for the transmission of digital data. The data transmission may be by cable connection, networking, telecommunications, etc. The video bitstream may be provided by an image capturing device.

An audio characteristic is retrieved from an audio bitstream (Step 102). This may be accomplished by receiving the audio bitstream and generating the audio characteristic by analyzing the audio bitstream. For example, an average volume may be calculated within a time period. Then, it can be determined whether the average volume exceeds a threshold. Depending on a result of determining whether the average volume exceeds the threshold, a signal may be generated correspondingly. The audio characteristic retrieved in Step 102 may be retrieved by a frequency analysis, a rhythm detection, and/or by a tempo analysis. The audio bitstream itself may be encoded from music or speech. For speech, the audio characteristic may be retrieved by analyzing tone of the speech or by speech recognizing technique.

A feature region is extracted from the video bitstream (Step 104). The feature region may be extracted from the video bitstream by extracting an image from the video bitstream, detecting a head region of the image, and extracting the feature region of the head region. The feature region may be extracted from the head region according to color information of the image, texture information of the image, and/or edge information of the image. Typical edge detection can be achieved by applying a Sobel filter both horizontally and vertically. As for texture recognition, differences with neighboring pixels may be computed for each pixel within a certain region, and the differences may be summarized in a histogram. Note that the texture information can be reflected by a pattern of the histogram.

The feature region may be modified according to the audio characteristic to generate a modified image (Step 106). Modification of the feature region may be accomplished in a number of different ways, including modifying coloration of the feature region according to the audio characteristic, and modifying texture of the feature region according to the audio characteristic. For example, if the audio characteristic is a very high volume, one type of modification may be made, whereas a very low volume may cause another type of modification.

The modified image may then be outputted through an output of the electronic device (Step 108). And, in addition to outputting the modified image, the embodiment of the present invention may also output the audio bitstream. For example, the video bitstream may be divided into a plurality of video segments for efficiency in storage or for efficiency in further processing. Then, the modified image may be embedded in at least one of the video segments. Similarly, the audio bitstream may be divided into a plurality of audio segments. Then, the audio segments may be synchronized with the modified video segments, and the synchronized modified video segments and audio segments may be outputted.

Figure 2A:
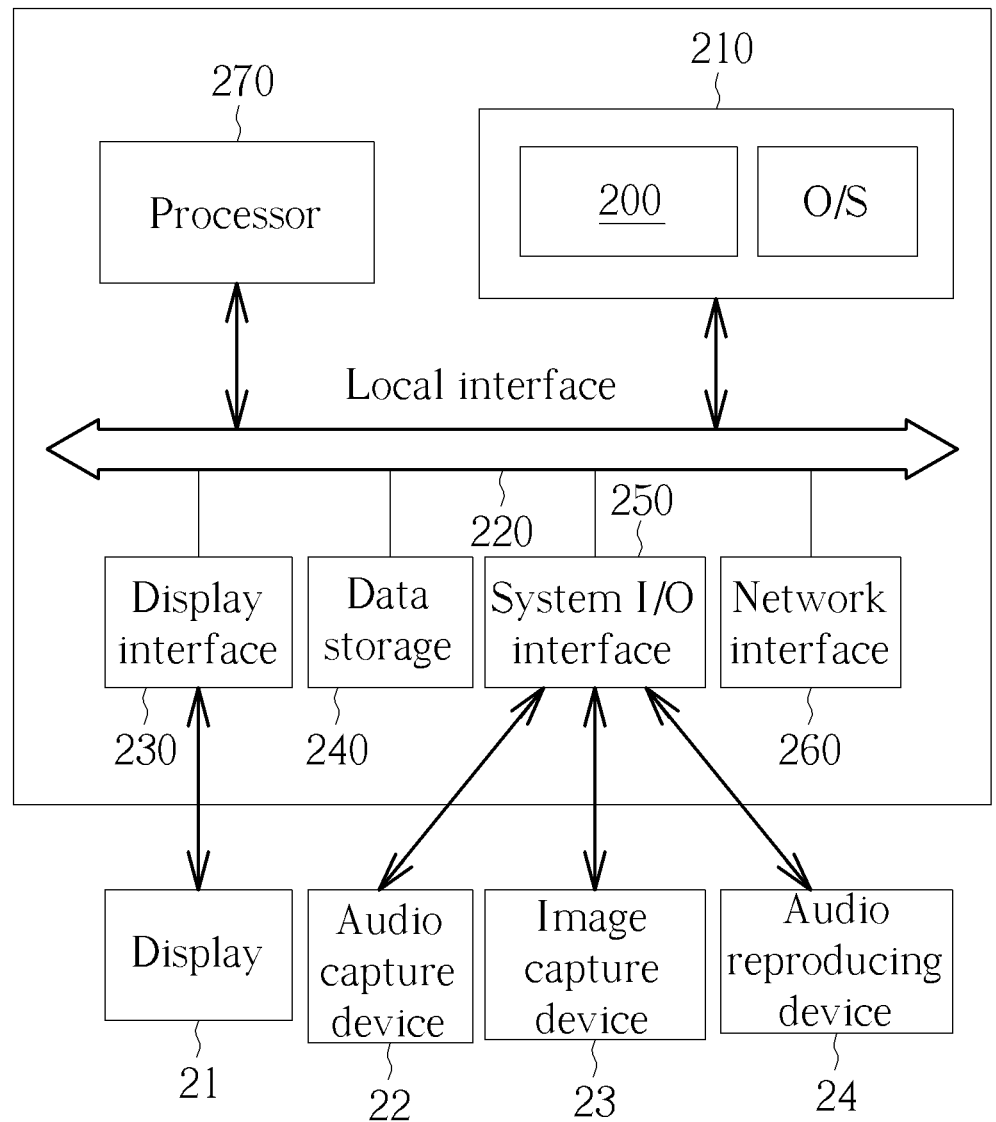
FIGS. 2A-2D are diagrams of an electronic device for realizing the facial image reproduction method of FIG. 1.

Please refer to FIGS. 2a-2d, which are diagrams of an electronic device for realizing the facial image reproduction method of FIG. 1. FIG. 2a is a diagram of system architecture of the electronic device. The electronic device comprises a processor 270, memory 210, a display interface 230, data storage 240, a system I/O interface 250, and a network interface 260. The memory 210 stores program code 200 and an operating system O/S. The display interface 230 controls a display 21, and the system I/O interface 250 is utilized for interfacing with an audio capture device 22, an image capture device 23, and an audio reproducing device 24. The processor 270, the memory 210, the display interface 230, the data storage 240, the system I/O interface 250, and the network interface 260 communicate with each other over a local interface 220.

Figure 2B:
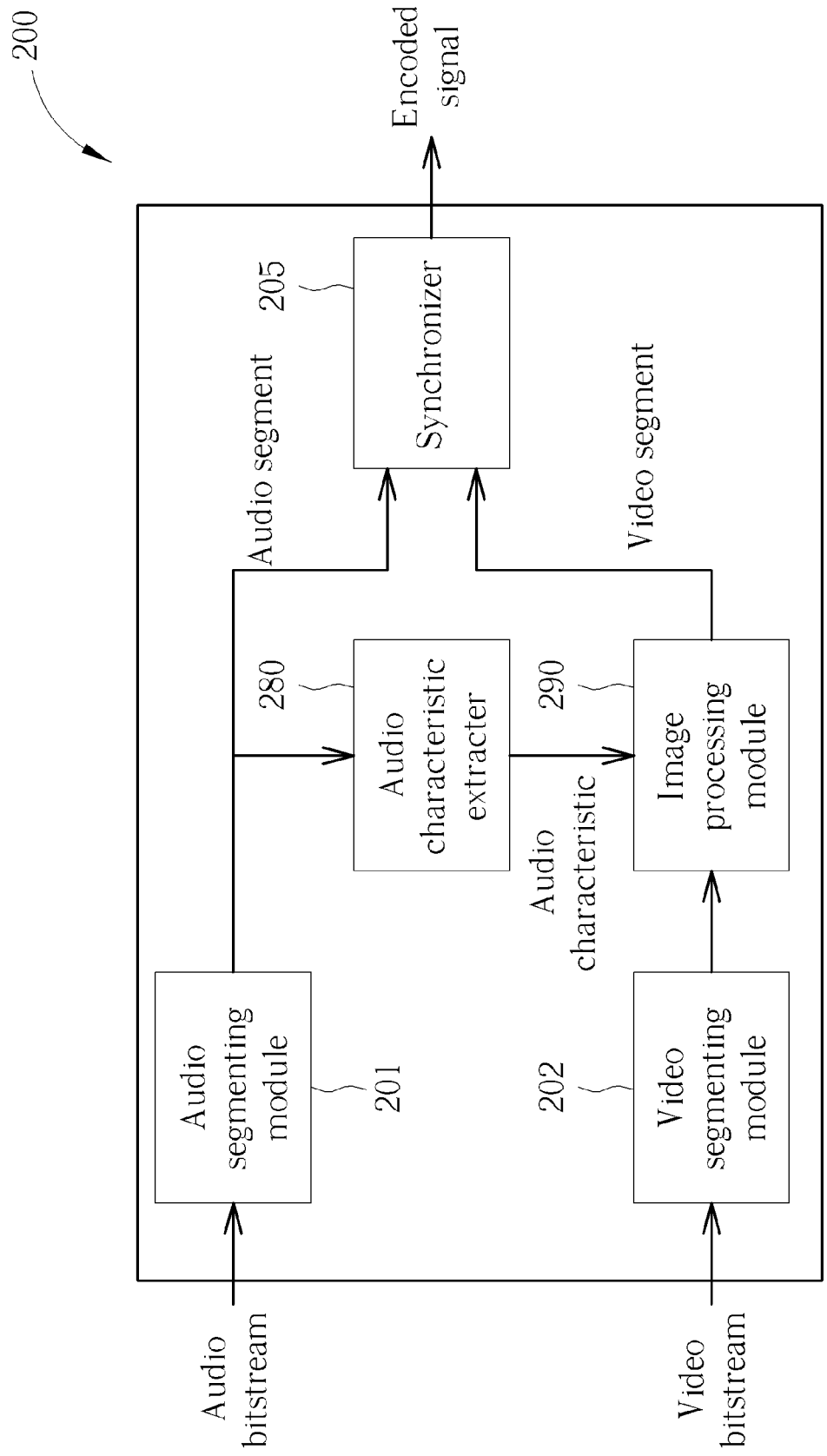

FIG. 2b shows cooperation of modules of the program code 200 shown in FIG. 2a. Each of the modules described below may be implemented in software code, but may also be implemented as an ASIC, or an FPGA. The program code 200 comprises an audio segmenting module 201, a video segmenting module 202, an audio characteristic extractor 280, an image processing module 290, and a synchronizer 205. The audio segmenting module 201 receives the audio bitstream, e.g. music playing in the electronic device or speech captured by a microphone, and segments the audio bitstream to form an audio segment. The audio characteristic extractor 280 generates the audio characteristic corresponding to the audio segment. The video segmenting module 202 receives the video bitstream, possibly from the image capture device 23, and segments the video bitstream to form a video segment. The image processing module 290 modifies the video segment according to the audio characteristic. The synchronizer 205 synchronizes and encodes the audio segment and the modified video segment for output.

Figure 2C:
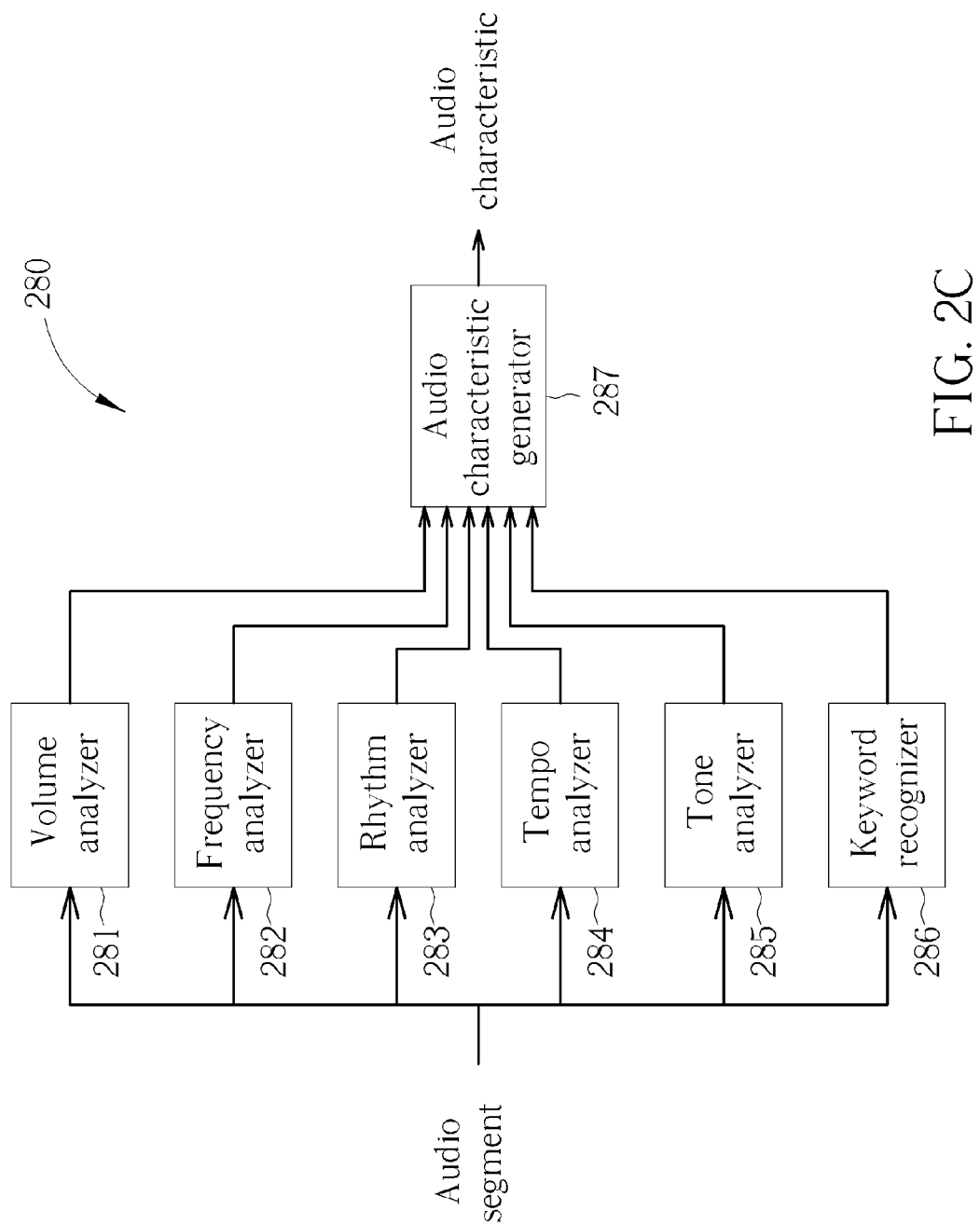

FIG. 2c a diagram of the audio characteristic extractor 280 of FIG. 2b. The audio characteristic extractor 280 comprises an audio characteristic generator 287, which takes inputs from a volume analyzer 281, a frequency analyzer 282, a rhythm analyzer 283, a tempo analyzer 284, a tone analyzer 285, and a keyword recognizer 286. The volume analyzer 281 may analyze volume of the audio bitstream to generate a volume analysis result. The frequency analyzer 282 may analyze frequency of the audio bitstream to generate a frequency analysis result. The rhythm analyzer 283 may analyze rhythm of the audio bitstream to generate a rhythm analysis result. The tempo analyzer 284 may analyze tempo of the audio bitstream to generate a tempo analysis result. The tone analyzer 285 may analyze tone of the audio bitstream to generate a tone analysis result. The keyword analyzer 286 may analyze speech of the audio bitstream to generate a keyword result. The audio characteristic generator 287 may then generate the audio characteristic based on all or part of the above mentioned results. As an example, the volume analyzer 281 may store volume data of the audio bitstream corresponding to a time period in a storage module, and a signal generator may generate a signal corresponding to a result of determining whether an average volume of the volume data exceeds a threshold. The signal then represents the volume analysis result mentioned above that is generated by the volume analyzer 281.

Figure 2D:
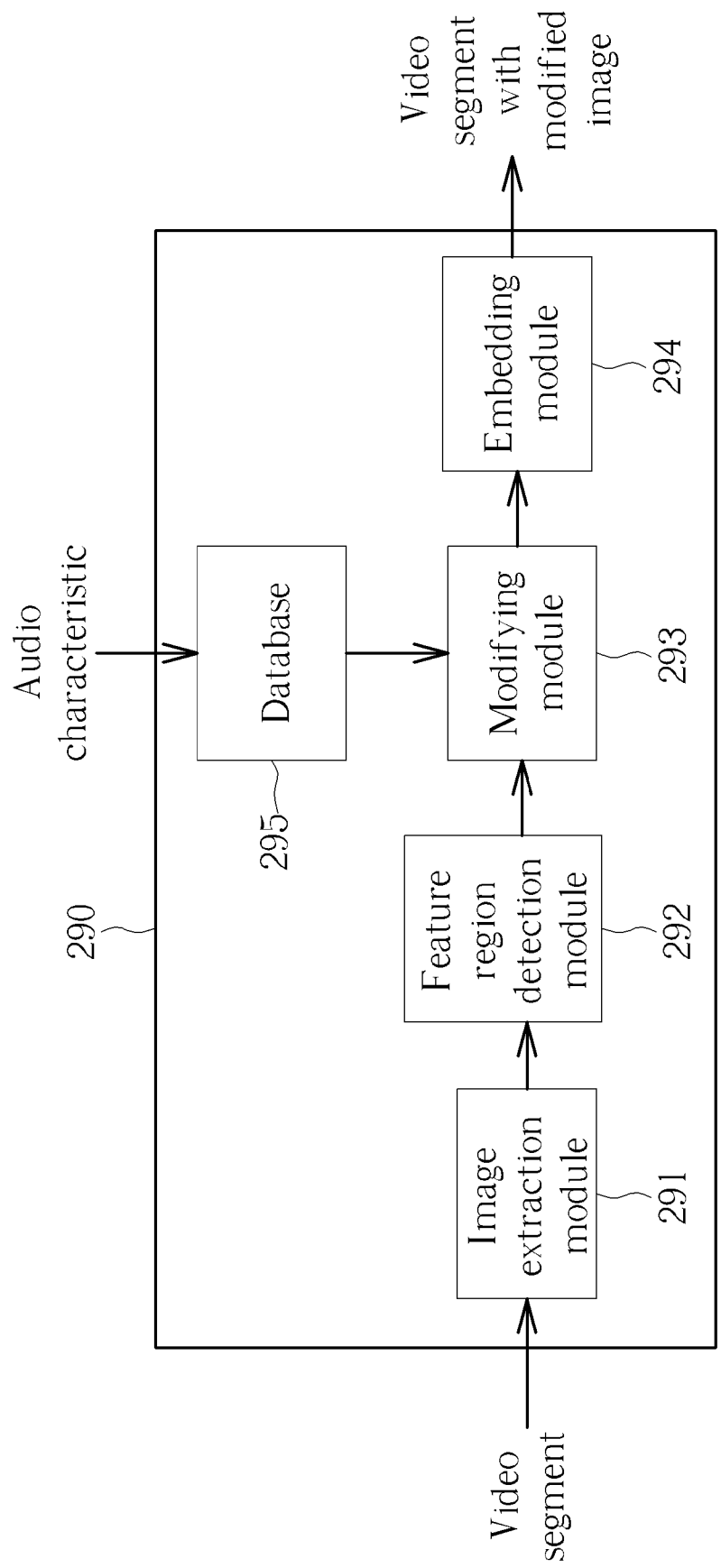

FIG. 2D is a diagram of the image processing module 290 of FIG. 2B. The image processing module 290 comprises an image extraction module 291, which receives the video segment from the video segmenting module 202. A feature region detection module 292 receives an image extracted by the image extraction module 291, and detects a feature region of the image, such as the head region, the eyes, ears, hair, lips, etc. Detection may be performed by analyzing color, texture, and/or edges of the image as described above. A modifying module 293 modifies the feature region of the image according to the audio characteristic by looking up the audio characteristic in a database 295, which stores behavior corresponding to the audio characteristic. An embedding module 294 then embeds the modified image into the video segment and outputs the video segment with the modified image.

For the modifying module 293 to determine how to modify the image, the image processing module 290 may further comprise the database 295, which stores the behaviors corresponding to the audio characteristic. FIG. 3 illustrates a mapping table that may be stored in the database 295, which represents relationships between the audio characteristic and the behaviors that may be stored in the database 295. Depending on different analysis results, shown under "Detected Pattern of the Sound," corresponding modifications may be made to the image, shown under "Corresponding Behavior of the Visual Effect." For example, if a sharp increasing in base frequency of the voice within a specific time is detected by the rhythm analyzer 283, an effect may be applied with respect to the rhythm, e.g. a face detected by the feature region detection module 292 may "blush" with the rhythm. In general, the vocal range of human voice lies within a range of 100 Hz and 1000 Hz. The most popular basic frequency within this range may be detected by analyzing human voices. It is noted that when a person feels happy or shy, his or her voice may exhibit an increase in the basic frequency. Therefore, by detecting that a "most popular basic frequency" shifts to a higher band, it may be determined that the human emotion changes and a specific effect may be applied to the feature region. If a beat is detected by the audio characteristic extractor 280, a blink effect may be applied in time with the beat. If a harmonic frequency response is detected by the frequency analyzer 282, musical notes may be displayed around the feature region. For speech, if a user's voice has an amplitude exceeding a predetermined threshold Thr1, and an average period between two neighboring beats is below a predetermined threshold Thr2, saturation of the face may be enhanced, and blended with red. Finally, a snoring symbol and a decreased eye size may be applied to the feature region when the amplitude of the voice is below a threshold Thr3, indicating that the user is silent. Of course, many other modifications are possible. For example, an excited setting, a quiet setting, or other types of settings may be set based on statistical models related to the volume, frequency, and/or rhythm of the sound. Types of modifications that may be made include replacements of pixels corresponding to the feature regions, or modifications of pixels corresponding to the feature regions. For example, the hair of the user may be replaced with a predetermined hair image. Or, the skin may be tinted in a gradient manner according to different levels of the volume, the frequency, or the rhythm. All modifications may be predetermined by default, or may be customized by the user. For example, the user may record an image or video clip for use in modifying the image according to the predetermined setting.

Figure 4:
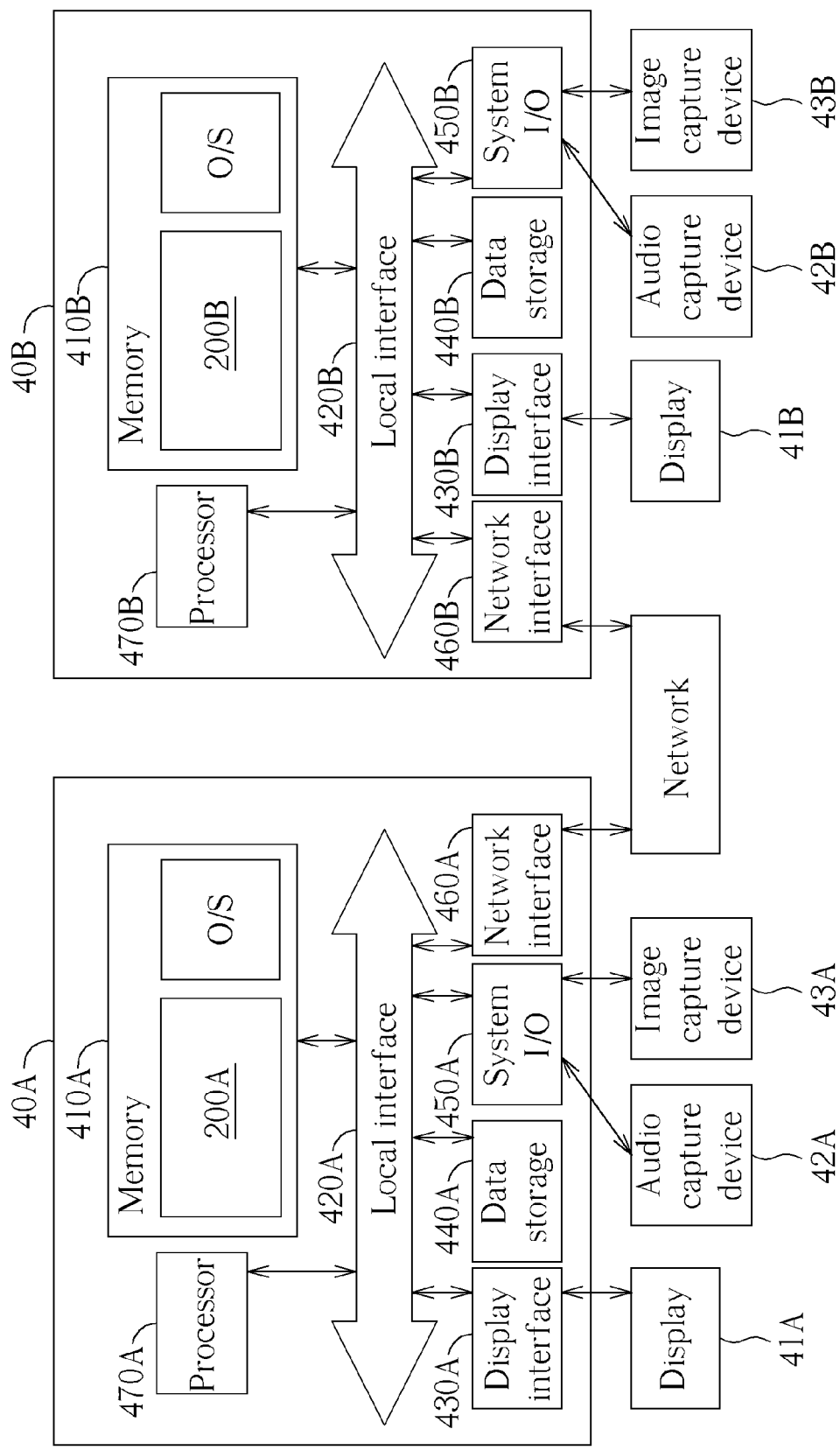
FIG. 4 is a diagram of a communications system for realizing the facial image reproduction method of FIG. 1.

FIG. 4 is a diagram of a communications system for realizing the facial image reproduction method of FIG. 1. As shown in FIG. 4, a first (transmitting) computing device 40A and a second (receiving) computing device 40B may communicate through a network. The transmitting computing device 40A may be a transmitting personal computer (PC), and the receiving computing device 40B may be a receiving personal computer (PC). The personal computers 40A, 40B respectively comprise a processor 470A, 470B, a memory 410A, 410B, a local interface 420A, 420B, a display interface 430A, 430B, data storage 440A, 440B, a system I/O interface 450A, 450B, and a network interface 460A, 460B. Each personal computer 40A, 40B may interface with a display 41A, 41B, an audio capture device 42A, 42B, such as a microphone, an image capture device 43A, 43B, and the network. Of course, the audio capture device 42A, 42B and the image capture device 43A, 43B may be integrated, e.g. in a webcam. In the embodiment shown in FIG. 4, the memory 410A, 410B stores an operating system and program code 200A, 200B similar to the program code 200 described above. The processor 470A, 470B, the memory 410A, 410B, the display interface 430A, 430B, the data storage 440A, 440B, the system I/O 450A, 450B, and the network interface 460A, 460B may communicate with each other through the local interface 420A, 420B.

The communication system shown in FIG. 4 may be utilized to provide two-way video chat over the network between a user of the transmitting PC 40A and a user of the receiving PC 40B. Considering only the first PC 40A, a chat client may be displayed in the display 41A, and video of the users may be captured by the image capture devices 43A, 43B for display in the display 41A. The video of the users may be modified to add effects dependent on audio.

Figure 5:
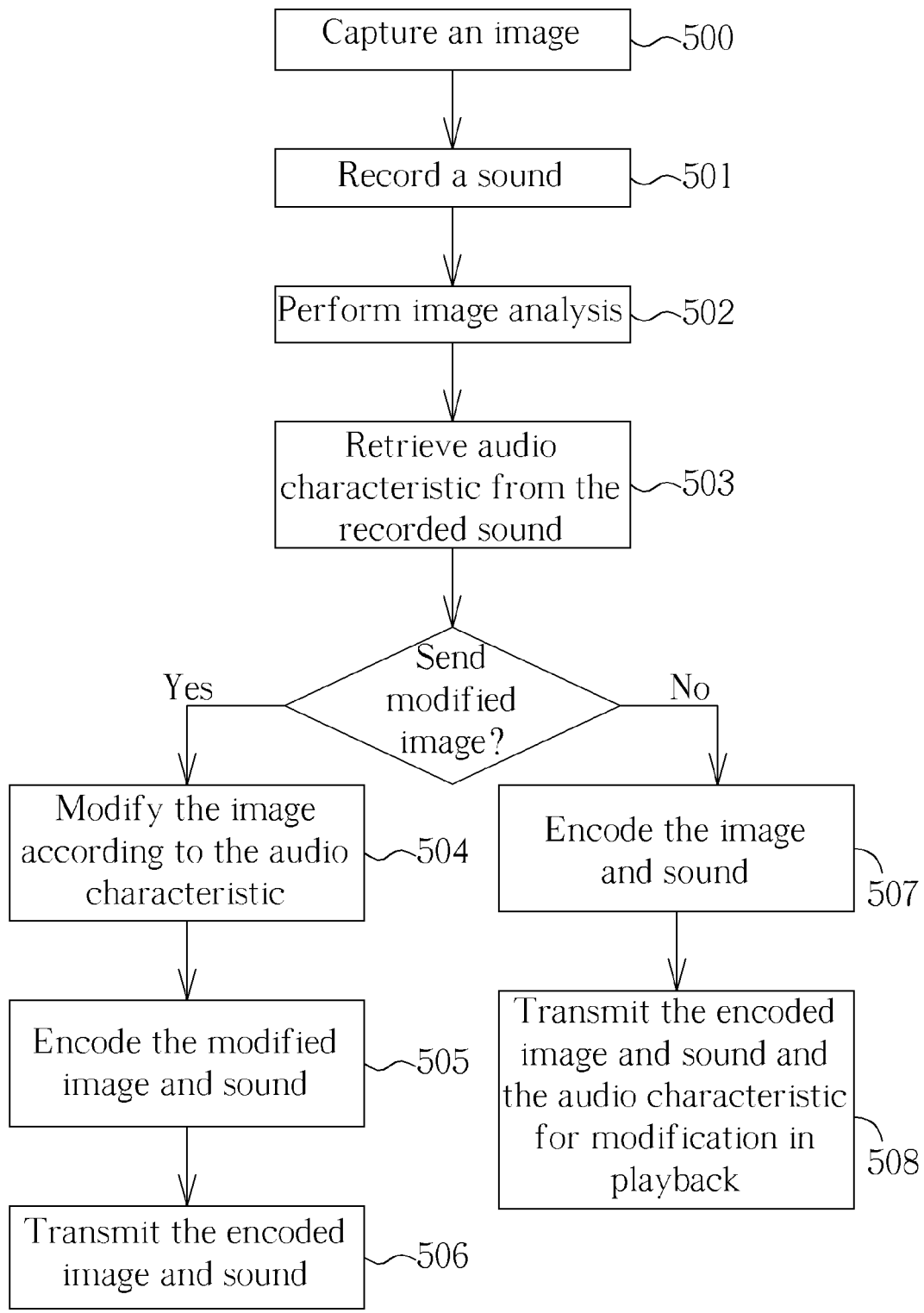
FIG. 5 is a diagram of a method for performing facial image reproduction according to another embodiment of the present invention.

Referring to FIG. 5, a process 50 may be utilized in the communications system to modify the video captured by the image capture device 42A or the image capture device 42B.

First, an image is captured (Step 500), and a sound is recorded (Step 501). Image analysis is performed on the image (Step 502), and an audio characteristic is retrieved from the recorded sound (Step 503). Then, the image may be modified according to the audio characteristic to form a modified image (Step 504), the modified image may be encoded with the sound to form an encoded modified signal (Step 505), and the encoded signal may be transmitted (Step 506). It is also acceptable for the image and sound to be encoded first to form an encoded unmodified signal (Step 507), and for the encoded modified signal to be transmitted with the audio characteristic (Step 508). In this way, a receiver of the encoded unmodified signal and the audio characteristic, e.g. the second PC 40B, may modify the encoded unmodified signal according to the audio characteristic prior to playback. In other words, modification may be performed prior to encoding or post encoding, and may be performed by either the transmitting device or the receiving device.

Thus, the method, electronic device, and communication system according to embodiments of the present invention allow the user to enhance his/her video stream conveniently based on sounds being processed. This enhances the video chat experience, allows for greater interaction between users, and also provides entertainment for all users in the chat session.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A communication system comprising:
    a transmitting computing device comprising:
        a system I/O interface configured to receive an audio signal and a video signal;
        a processor configured to encode the audio signal and the video signal; and
        a network interface configured to transmit the encoded signal; and
    a receiving computing device comprising:
        a network interface configured to receive the encoded signal from the transmitting computing device;
        a processor configured to decode the encoded signal to retrieve the audio signal and the video signal, determine an audio characteristic of the audio signal, extract a facial feature region from an image of the video signal, and modify the extracted facial feature region of the image of the video signal to express human emotion changes indicated by the audio characteristic to generate a modified image; and
        a display interface configured to output the modified image.

* * * * *